United States Patent
Khamesra et al.

(10) Patent No.: US 10,554,140 B1
(45) Date of Patent: Feb. 4, 2020

(54) AC-DC CONVERTER WITH SECONDARY SIDE-CONTROL AND SYNCHRONOUS RECTIFIER SENSE ARCHITECTURE

(71) Applicant: Cypress Semiconductor Corporation, San Jose, CA (US)

(72) Inventors: Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/453,705

(22) Filed: Jun. 26, 2019

(51) Int. Cl.
*H02M 3/335* (2006.01)
(52) U.S. Cl.
CPC .............................. *H02M 3/33592* (2013.01)
(58) Field of Classification Search
CPC ............. H02M 3/335; H02M 3/33538; H02M 3/33553; H02M 3/33569; H02M 3/33576; H02M 3/33592; H02M 7/217
See application file for complete search history.

(56) References Cited

U.S. PATENT DOCUMENTS

| | | | |
|---|---|---|---|
| 5,485,361 A | 1/1996 | Sokal | |
| 6,381,152 B1 * | 4/2002 | Takahashi | H02H 7/1206 363/21.06 |
| 6,456,511 B1 | 9/2002 | Wong | |
| 6,504,267 B1 | 1/2003 | Giannopoulos | |
| 6,671,189 B2 * | 12/2003 | Jansen | H02M 3/33576 363/21.13 |
| 8,581,505 B2 | 11/2013 | Melanson | |
| 8,792,257 B2 | 7/2014 | Berghegger | |
| 8,964,420 B2 | 2/2015 | Zhang | |
| 9,093,903 B2 | 7/2015 | Swaminathan et al. | |
| 9,325,246 B1 | 4/2016 | Peng et al. | |
| 9,379,625 B2 | 6/2016 | Kesterson et al. | |

(Continued)

FOREIGN PATENT DOCUMENTS

| | | |
|---|---|---|
| JP | 6336784 B2 | 6/2018 |
| WO | 2009010802 A2 | 1/2009 |
| WO | 2018213015 A1 | 11/2018 |

OTHER PUBLICATIONS

USPTO Non-Final Rejection for U.S. Appl. No. 16/455,568 dated Aug. 22, 2019, 9 pages.

(Continued)

*Primary Examiner* — Gary L Laxton (57) ABSTRACT

An AC-DC converter with secondary side control and synchronous rectifier (SR) architecture and method for operating the same are provided for reducing the cost, complexity and size of the converter while improving efficiency. Generally, the secondary side controller includes a zero-crossing detector block, a negative-sensing block, a peak-detector block and a line-feed-forward block integrated in an integrated circuit (IC), and coupled to a secondary side of the converter through a single SR-sense (SR_SNS) pin through which the IC is coupled to a drain of the SR. The single SR_SNS pin has a maximum input voltage less than a rectified AC input voltage input to a secondary side of the converter, and, in one embodiment, is coupled to the drain of the SR through a voltage divider circuit including circuit elements both internal and external to the IC along with a rectifier element in series with the internal resistor.

22 Claims, 9 Drawing Sheets

(56) References Cited

U.S. PATENT DOCUMENTS

| | | |
|---|---|---|
| 9,502,985 B2 | 11/2016 | Werner et al. |
| 9,998,014 B2 | 6/2018 | Yao et al. |
| 2010/0027298 A1 | 2/2010 | Cohen |
| 2012/0250366 A1 | 10/2012 | Wang et al. |
| 2015/0103567 A1 | 4/2015 | Wang et al. |
| 2016/0359421 A1 | 12/2016 | Lin et al. |
| 2017/0033698 A1 | 2/2017 | Vemuri et al. |
| 2018/0351462 A1 | 12/2018 | Li et al. |
| 2018/0358902 A1 | 12/2018 | Duvnjak |
| 2019/0149056 A1 | 5/2019 | Zheng et al. |

OTHER PUBLICATIONS

"UCC24630 Synchronous Rectifier Controller With Ultra-Low-Standby Current" Texas Instruments, Mar. 2015, pp. 1-41; 41 pages.
USPTO Notice of Allowance for U.S. Appl. No. 16/455,568 dated Nov. 29, 2019; 9 pages.

* cited by examiner

AC-DC CONVERTER WITH SECONDARY SIDE-CONTROL AND SYNCHRONOUS RECTIFIER SENSE ARCHITECTURE

TECHNICAL FIELD

This disclosure relates generally to AC-DC power converters, and more particularly to secondary controlled converters including synchronous rectifier sense architecture and methods of operating the same.

BACKGROUND

AC-DC converters convert power from an alternating current (AC) source to a direct current (DC) at a specified voltage level. AC-DC converters using secondary side control can deliver power more efficiently for a given size and weight, and are therefore widely used in portable electronic devices. Generally, an AC-DC converter transfers power from an AC input connected or coupled to a primary side of a transformer to a DC output coupled to a secondary side of the transformer.

Figure 1:
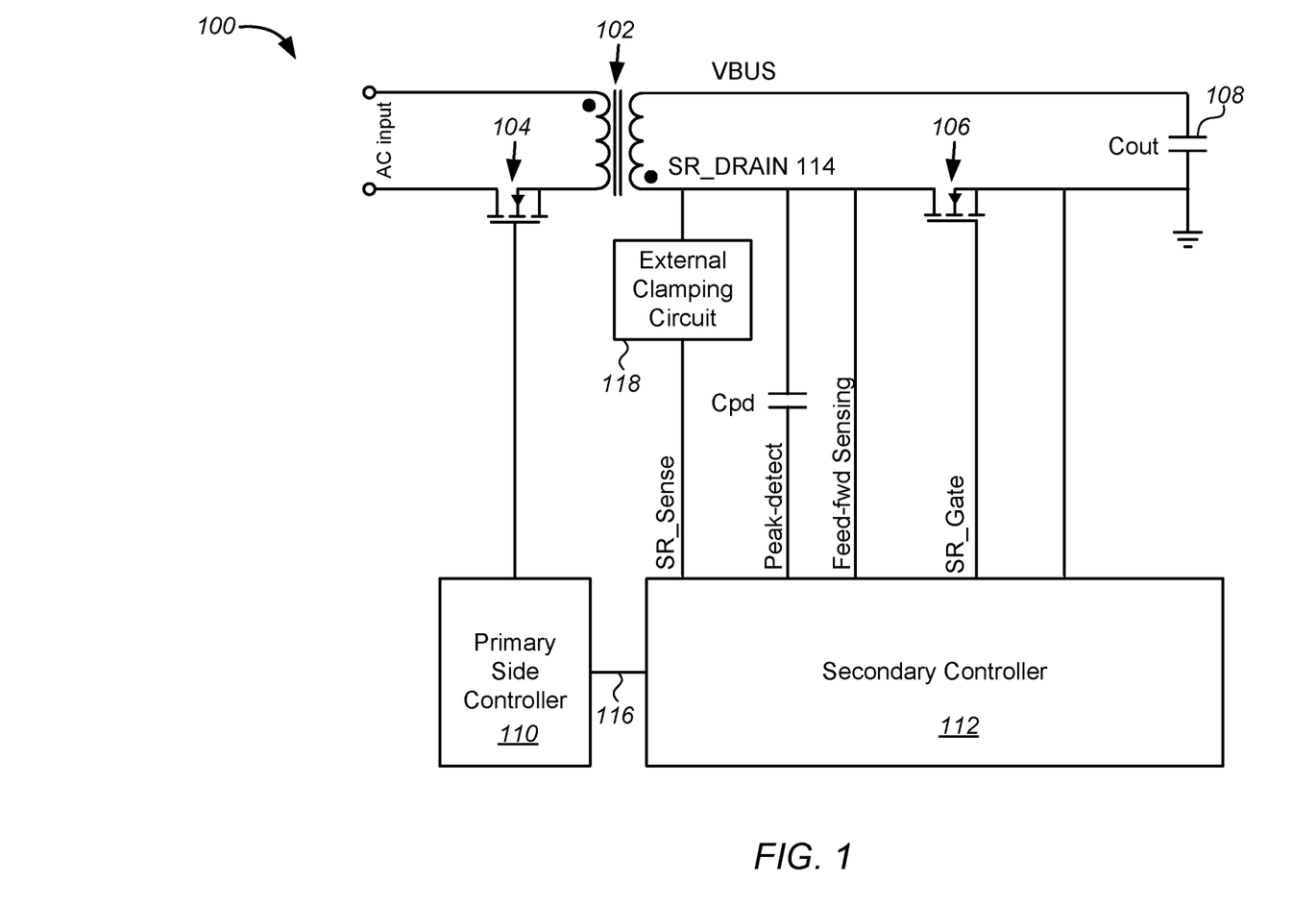
FIG. 1 is a schematic block diagram illustrating a AC-DC converter for which a secondary-side controller and synchronous rectifier (SR) architecture of the present disclosure is particularly useful.

A simplified schematic block diagram of one such AC-DC converter including a synchronous rectifier (SR) sense architecture is shown in FIG. 1. Referring to FIG. 1 the AC-DC converter 100, generally includes a transformer 102, an active rectification element or power switch (PS), such as a PS field effect transistor (PS_FET 104) on a primary side of the transformer, a synchronous rectifier (SR), such as a SR field effect transistor (SR_FET 106) on a secondary side of the transformer, and an output filter or capacitor 108. In operation the PS_FET 104 switches power to the primary side on or off in response to a signal from a primary side controller 110. In secondary side controlled converters a secondary side controller 112 coupled to a drain node (SR_DRAIN 114) and gate of the SR_FET 106 senses voltage on the SR_DRAIN and turns the SR_FET on and off in response to sensed voltage peaks, and negative and zero-crossings.

In a flyback converter, the primary side controller 110 receives a signal from the SR_FET 106 or secondary side controller 112 over a feedback or flyback path 116. During the time in which the PS_FET 104 is on or closed with SR_FET 106 being off or open, the AC-DC converter 100 is said to be operating in fly-back mode, and a magnetic field builds up in the transformer 102 while a current on the primary side increases linearly. When the PS_FET 104 is off or opened, and SR_FET 106 is on or closed, the AC-DC converter 100 transfers the power to secondary side, in which the magnetic field begins to collapse and the secondary side current decreases steadily, but gradually as power is given to the Cout 108 connected to the output until a point is reached at which there is substantially zero current flow in the secondary.

One problem with previous generations of AC-DC converters using SR-sense architecture is that depending on the turn-ratio (N:1) of the transformer 102 (typically 4:1), a voltage on the drain node 114 of the SR_FET 106 can go beyond the 1/Nth of rectified AC input voltage, often as high as 115V for 230V AC input. This in turn requires the use of a relatively large and expensive high-voltage FETs on SR_DRAIN node as well as additional electrostatic discharge (ESD) circuitry in the secondary side controller 112 to safely couple this voltage from the drain node 114 to the secondary side controller.

Prior approaches to at least partially addressing the above problem rely on use of a large, high power FET made with greater than 150V tolerant technology to sense SR_DRAIN node inside Secondary Controller 112 or use of external clamping circuits 118 to clip the input to the secondary side controller 112. These approaches have not been wholly satisfactory as the secondary side controller 112 is often realized as an integrated circuit (IC), and the use an external clamping circuit 118 to clip the input to the IC requires additional package pins and external components and connections for peak-detecting and feed-forward (feed-fwd) sensing because externally clipping the voltage on the SR_DRAIN 114 interferes with these detections. Thus, use of external clamping circuits 118 increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters.

Another problem with previous generations of AC-DC converters 100, and secondary side controlled flyback converters in particular, arises due to requirement of detection of a valley or minimum voltage on the primary. In AC-DC converters 100 the PS_FET 104 should be turned on at the valley to minimize conduction loss and thereby achieve optimal efficiency. However, in secondary side controlled flyback converters 100, such as shown in FIG. 1, because the valley on the primary is detected as a peak on secondary side, which corresponds to a peak on secondary, detection of the peak needs to be done accurately. This additional requirement of peak detection results in additional components to be added on SR_DRAIN node, as the external clamping circuit 118 will not allow peaks on SR_DRAIN to be sensed accurately. Hence, additional component is required to be added on SR_DRAIN 114 for example Cpd is added in AC-DC converter 100, shown in FIG. 1 Thus, use of external peak-detect component (Cpd) increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters. Consequently, with previous generations of flyback converters 100, it is not possible to hit the valley accurately resulting in loss of efficiency.

Accordingly, there is a need for an AC-DC converter with secondary side control and SR-sense architecture and methods for operating the same that reduces cost and complexity without affecting performance. There is a further need for a flyback converter with secondary side control and SR-sense architecture and methods for operating the same that provides accurate valley detection for improved efficiency.

SUMMARY

AC-DC converters with secondary side control and synchronous rectifier (SR) architecture and methods of operating the same are provided for reducing the cost, complexity and size of the converter while improving efficiency.

In one embodiment, the secondary side controller includes a zero-crossing detector block, a negative-sensing block, and a peak-detector block integrated or packaged as a single integrated circuit (IC), and coupled to a secondary side of the converter through a single SR-sense (SR_SNS)

pin through which the IC is coupled to a drain of a synchronous rectifier (SR), such as a SR-field effect transistor (SR_FET). Generally, the single SR-SNS pin has a maximum input voltage less than a maximum rectified AC input voltage to a secondary side of the AC-DC converter, and is coupled to the drain of the SR through a voltage divider circuit including circuit elements both internal and external to the IC.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

AC-DC converters with secondary side control and synchronous rectifier (SR) architecture including a single SR-sense (SR_SNS) pin and methods of operating the same are disclosed for reducing the cost, complexity and size of the converter while improving efficiency. The system and methods of the present disclosure are particularly useful in or with AC-DC flyback converters to improve valley detection for improved control of a primary side power switch or primary FET by a secondary side controller to improve efficiency of the converter.

Figure 2A:
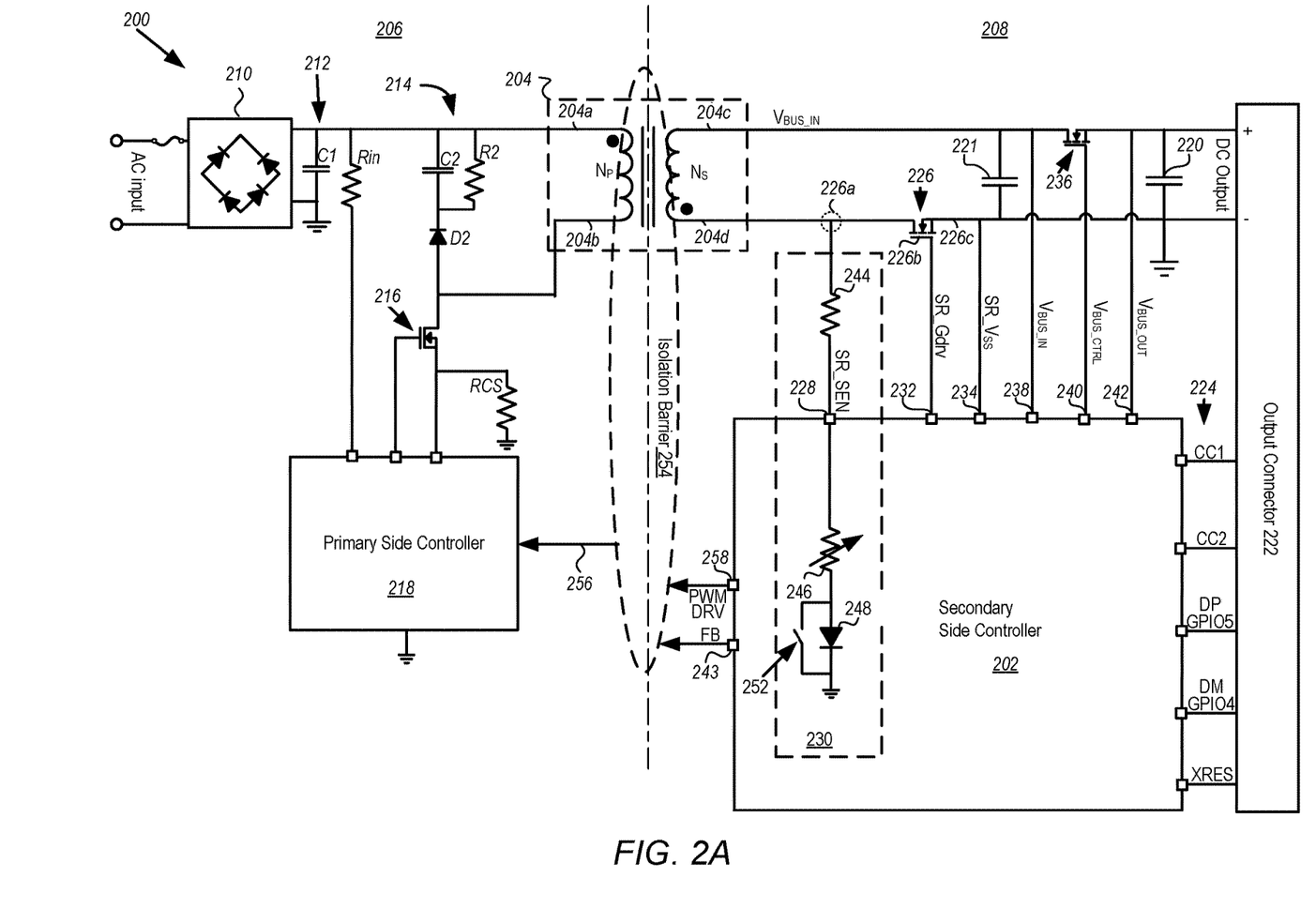
FIG. 2A is a schematic block diagram depicting an embodiment of an AC-DC converter including a secondary-side controller and SR architecture in accordance with the present disclosure.

An embodiment of an AC-DC converter including a secondary-side controller and SR architecture in accordance with the present disclosure will now be described with reference to FIGS. 2A through 2E. FIG. 2A is a schematic block diagram of an AC-DC converter 200 including an embodiment of a secondary-side controller 202 and having an SR architecture in accordance with the present disclosure. Referring to FIG. 2A, the AC-DC converter 200 generally includes a transformer 204 having a primary winding (NP) on a primary side 206 electrically connected or coupled to an AC input, and a secondary winding (NS) on a secondary side 208 coupled to a DC output.

On the primary side 206 a rectifying circuit, such as a bridge rectifier 210, and one or more input filters 212, 214, coupled to a first terminal 204a of the transformer 204 rectify an AC input voltage and supply input power to the primary winding of the transformer 204. The input filters can include a first input filter 212 having a capacitor (C1) coupled to or across an output of the rectifier 210, and a second, RC filter 214 including a resistor or resistive element (R2) and a capacitor (C2) coupled in parallel between the first terminal 204a of the transformer 204 and a cathode of a diode or rectifier (D2) having an anode coupled to a second terminal 204b of the transformer. Generally, as in the embodiment shown, the AC-DC converter 200 further includes a power switch (PS 216), such as a primary field effect transistor (PR_FET), having a first or drain node coupled to the second terminal 204b of the transformer 204, a second or gate node coupled to a primary side controller 218, and a third or source node coupled to the primary side controller and, through a current sensing element, such as a resistive element (RCS) to ground to sense a primary side current (I_primary) flowing through the primary winding when the PS 216 is closed or conducting. Generally, as in the embodiment shown, the primary side controller 218 is further coupled to the first terminal 204a of the transformer 204 through a resistive element (Rin) to receive a voltage or signal equal or proportional to the rectified AC input voltage.

On the secondary side 208 the AC-DC converter 200 includes a filter capacitor 221 coupled between a third terminal 204c of the transformer 204 and an electrical ground or ground terminal, and an output capacitor 220 coupled between a third terminal 204c of the transformer 204 and an electrical ground provide a DC output voltage to an output interface or connector 222. Generally, as in the embodiment shown the output connector 222 is further coupled to the secondary side controller 202 through a number of communication channels 224 to support various charging protocols. Suitable output connectors 222 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 200 is compliant with the USB protocol to provide a DC output voltage of about 3.3 VDC to about 21.5 VDC at a current of from about 0 to about 3000 milliamps (mA).

In accordance with the present disclosure, the AC-DC converter 200 further includes on the secondary side 208 a synchronous rectifier (SR 226), such as a synchronous rectifier field effect transistor (SR_FET), coupled between a fourth terminal 204d of the transformer 204 and the ground terminal of the DC output. The SR 226 includes a first or drain node 226a coupled to the fourth terminal 204d of the transformer 204 and the secondary side controller 202 to sense a voltage on the drain of the SR; a second or gate node 226b coupled to the secondary side controller to drive or control the SR; and a third or source node 226c coupled to the secondary side controller and the ground terminal of the DC output.

In certain embodiments, such as that shown, the secondary side controller 202 is realized or implemented as single integrated circuit (IC), or as a number of ICs packaged in a single IC package, and the drain node 226a is coupled to a single SR-SNS pin 228 of the IC through a voltage divider 230 including circuit elements both internal and external to the IC of the secondary side controller. The gate node 226b of the SR 226 is coupled to the secondary side controller 202 through a SR-drive pin 232, and the source node 226c of the SR is coupled to the secondary side controller through a SR-Vss (ground voltage level) pin 234.

Optionally, as in the embodiment shown, the secondary side further includes an additional or secondary switch (SS) 236, such as a NFET, coupled between the third terminal 204c of the transformer 204 and a positive DC output to enable to the secondary side controller 202 to turn off the DC output to protect against over voltage and/or under voltage conditions. The SS 236 includes a source node coupled to a voltage bus in pin ($V_{BUS\_IN}$) 238 of the secondary side controller 202; a gate node coupled to a voltage bus control pin ($V_{BUS\_CTRL}$) 240 to drive or control the SS; and a drain node coupled to a voltage bus out pin ($V_{BUS\_OUT}$) 242 and to the positive terminal of the DC output.

The voltage divider 230 includes an external resistive element 244, an internal resistive element 246 and an internal rectifier 248. Although shown schematically as a diode, it will be understood that this need not be case in every embodiment, and that internal rectifier 248 may be a PN diode (as shown), or alternatively, a synchronous diode or a FET configured or connected to function as a diode. The configuration or placement of the internal rectifier 248, i.e., connected with a cathode to ground, ensures that during negative sensing or zero-crossing operations there is substantially no current flow through the voltage divider 230, thereby allowing the full, undivided negative voltage on the drain node 226a to be coupled to the SR-SNS pin 228. A resistance value of external resistive element 244 is generally fixed by the manufacturer of the AC-DC converter 200 and is selected based on an expected maximum voltage on the drain node 226a based on the maximum AC voltage input, and turn-ratio of the transformer 204 to limit a maximum voltage on the SR_SEN node 228 to enable the secondary side controller 202 to be a made with non-high voltage devices, made using standard, low voltage technologies. Suitable values for the resistance of the resistive element 244 are from about 4KΩ to about 10 KΩ. For example in one embodiment in which the maximum input voltage after bridge rectifier 210 is 380V and the transformer 204 has a 4:1 turn ratio, and the voltage of 21.5V DC on $V_{BUS\_IN}$, the SR_DRAIN 226a voltage can be 116.5V. Secondary side controller 202 is fabricated using a 20V tolerant technology, and the external resistive element 244 has a resistance of about 10KΩ and internal resistance of about 2KΩ to limit the maximum voltage on the drain node 226a to no more than about 21. 5V.

The internal resistive element 246, shown schematically as a variable resistance in FIG. 2A, can have a resistance value set by the manufacturer at the time the AC-DC converter 200 is manufactured based on either desired input or output voltages, or to compensate for variations in parameters of the IC or other components in the AC-DC converter. Alternatively, the resistance value of the internal resistive element 246 can be dynamically adjusted by a calibration circuit in the AC-DC converter 200 or secondary side controller 202, either at start-up or powering on of the AC-DC converter, or periodically thereafter.

Optionally, as in the embodiment shown, the voltage divider 230 further includes a bypass switching element or switch 252 in parallel the internal rectifier 248. The switch 252 is closed during feed-forward (ff) sensing in response to an ff-signal (ff_enable) generated in the secondary side controller 202 upon detection of an increasing or non-zero positive voltage on the drain node 226a, which indicates a feed-forward operation. It is noted that although in the embodiment shown in FIG. 2A the internal rectifier 248 and the switch 252 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

As shown in FIG. 2A, the AC-DC converter 200 further includes an isolation circuit or barrier 254 to electrically isolate the secondary side 208 from the high AC input voltage present on the primary side 206. Because the transformer 204 is a step down transformer it is generally considered part of the isolation barrier 254. Additionally where, as in the embodiment shown, the AC-DC converter 200 is a flyback converter in which a signal 256 is provided to the primary side controller 218 from pins on the secondary side controller 202, such as a feedback pin 243 or pulse width modulation (PWM) drive pin 258, the isolation barrier 254 can further include additional circuits or elements between the secondary side controller and the primary side controller 218 or PS 216. Details of these additional circuits or elements according to various embodiments are described below with reference to FIGS. 2C and 2D.

Figure 2B:
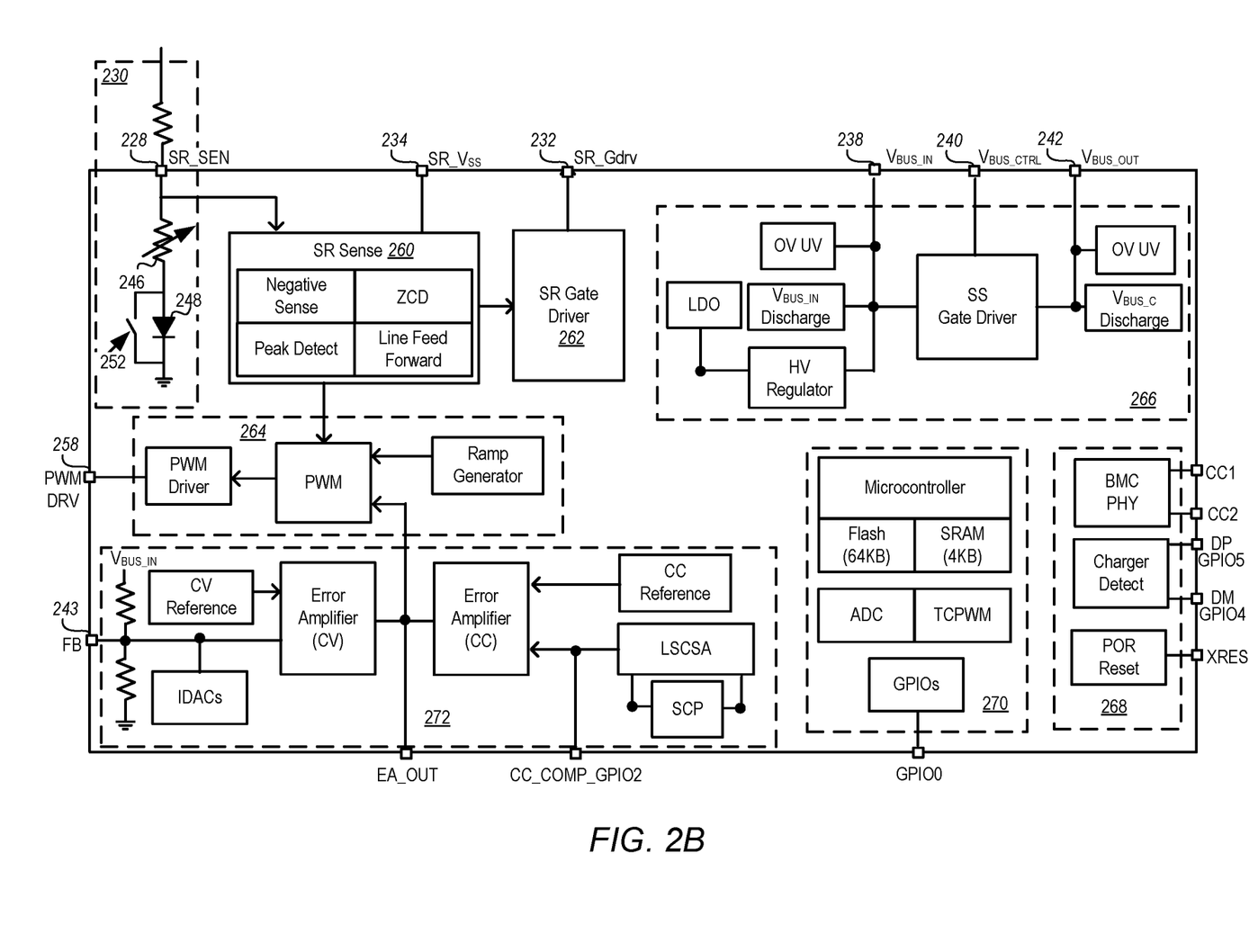
FIG. 2B is a detailed block diagram depicting an embodiment of the secondary-side controller of FIG. 2A in accordance with the present disclosure.

FIG. 2B is a detailed block diagram depicting an embodiment of the secondary-side controller 202 of FIG. 2A. Referring to FIG. 2B, in addition to the voltage divider 230 the secondary-side controller 202 generally further includes an SR sense circuit or block 260 and a SR gate driver circuit or block 262 coupled to the gate node 226b of the SR 226 through the SR-drive pin 232. The SR sense block 260 is coupled to the drain node 226a of the SR 226 through the single SR-SNS pin 228 and the voltage divider 230 and through the SR-Vss pin 234 to the source node 226c of the SR. The SR sense block 260 generally includes a zero-crossing detector (ZCD) block, a negative-sensing (NSN) block, a peak-detector (PKD) block, and a line-feed-forward (LFF) block for sensing a voltage on the drain 226a of the SR 226 to sense or detect a zero-crossing, a negative voltage, a peak (positive) voltage and a feed-forward operation. One or more outputs of the SR sense block 260 are coupled to the SR gate driver block 262 to control the SR 226 and to a pulse width modulation (PWM) circuit 264 to provide a signal 256 through the PWM drive pin 258 to the primary side controller 218 to control the PS 216. The PWM circuit 264 includes a ramp generator and PWM for generating a signal having a modulated pulse width, and a PWM driver for boosting a voltage or power of the signal to that necessary for driving the primary side controller 218 or PS 216.

As shown in FIG. 2B, the secondary side controller 202 further includes a secondary switch (SS) circuit 266. The SS circuit 266 includes OV-UV circuits or blocks for detection over voltage (OV) and under voltage (UV) conditions on $V_{BUS\_IN}$ 238 and $V_{BUS\_OUT}$ 242; low dropout (LDO) and high voltage (HV) regulators; and discharge circuits or blocks for discharging $V_{BUS\_IN}$ and $V_{BUS\_OUT}$.

An interface circuit 268 switch includes circuits or blocks for communicating with a device being powered or charged by the AC-DC converter 200 to support various charging protocols. These circuits or blocks can include a Biphase Mark Code (BMC) physical layer (PHY) to communicate with device using certain charging protocols, a charger detect block and a power on reset (POR) block to reset the device, putting it into a known state on initiation of charging by the AC-DC converter 200.

The secondary side controller 202 further includes a microcontroller unit (MCU) subsystem 270 including logic a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown.

Lastly, the secondary side controller 202 further includes a feedback circuit or circuit 272 coupled to the feedback pin 243 to provide error correction to the PWM circuit 264, and, in certain embodiments of the isolation barrier 254 to provide a feedback signal to the primary side controller 218. Generally, as in the embodiment shown circuit 272 includes a constant voltage (CV) reference, a constant current (CC) reference, one or more error amplifiers and inter-digital analog converters (IDACs), a low-side current sense amplifier (LSCSA), and a short circuit protection (SCP) block.

Embodiments of the isolation barrier 254 of the AC-DC converter 200 of FIG. 2A will now be described with reference to FIGS. 2C and 2D. It is noted that FIGS. 2C and 2D each illustrate one exemplary embodiments of the isolation barrier 254, and that other embodiments of the isolation barrier can be implemented that may or may not include all elements and components shown in these figures. Thus, the embodiments of FIGS. 2C and 2D are not intended to limit the present invention and the appended claims in any way.

Figure 2C:
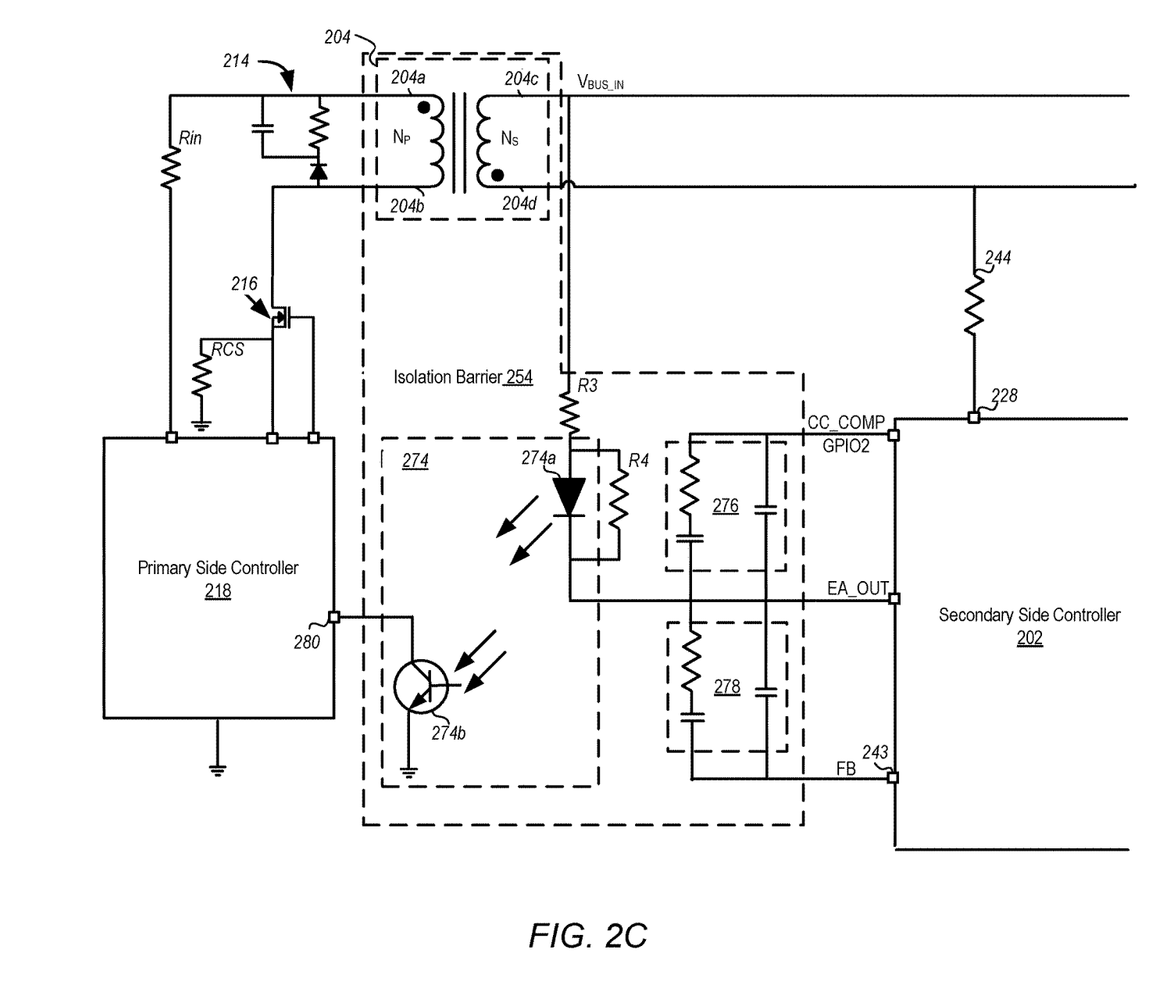
FIG. 2C is a schematic block diagram depicting an embodiment of the isolation barrier of FIG. 2A including an opto-isolator in accordance with the present disclosure.

Referring to FIG. 2C, in a first embodiment the isolation barrier 254 includes an opto-isolator 274 to provide electrical isolation between the feedback pin 243 of the secondary side controller 200 and the primary side controller 218. Generally, the opto-isolator includes a light emitting element, such as a light emitting diode (LED) 274a and a light sensitive element, such as a light sensitive or phototransistor 274b. The LED 274a has a cathode coupled directly to an error amplifier output pin (EA OUT), and an anode coupled to the third terminal 204c of the transformer 204 through a voltage divider including a first resistive element (R3) and a second resistive element (R4). The cathode of the LED 274a is further coupled to the FB pin 243 and to a constant current compensation general purpose input/output (CC_COMP_GPIO), through resistor-capacitor filters or networks 276 and 278. The phototransistor 274b can include a bipolar NPN transistor, and is coupled to the primary side controller 218 through an FB_input pin 280. In this embodiment, the secondary side controller 202 uses outputs from the error amplifier 272 to take the feedback from the secondary side and pass it on to the primary controller over the opto-isolator 274. This architecture provides three key features: secondary side sensing and regulation, synchronous rectification, and charging port controller.

Figure 2D:
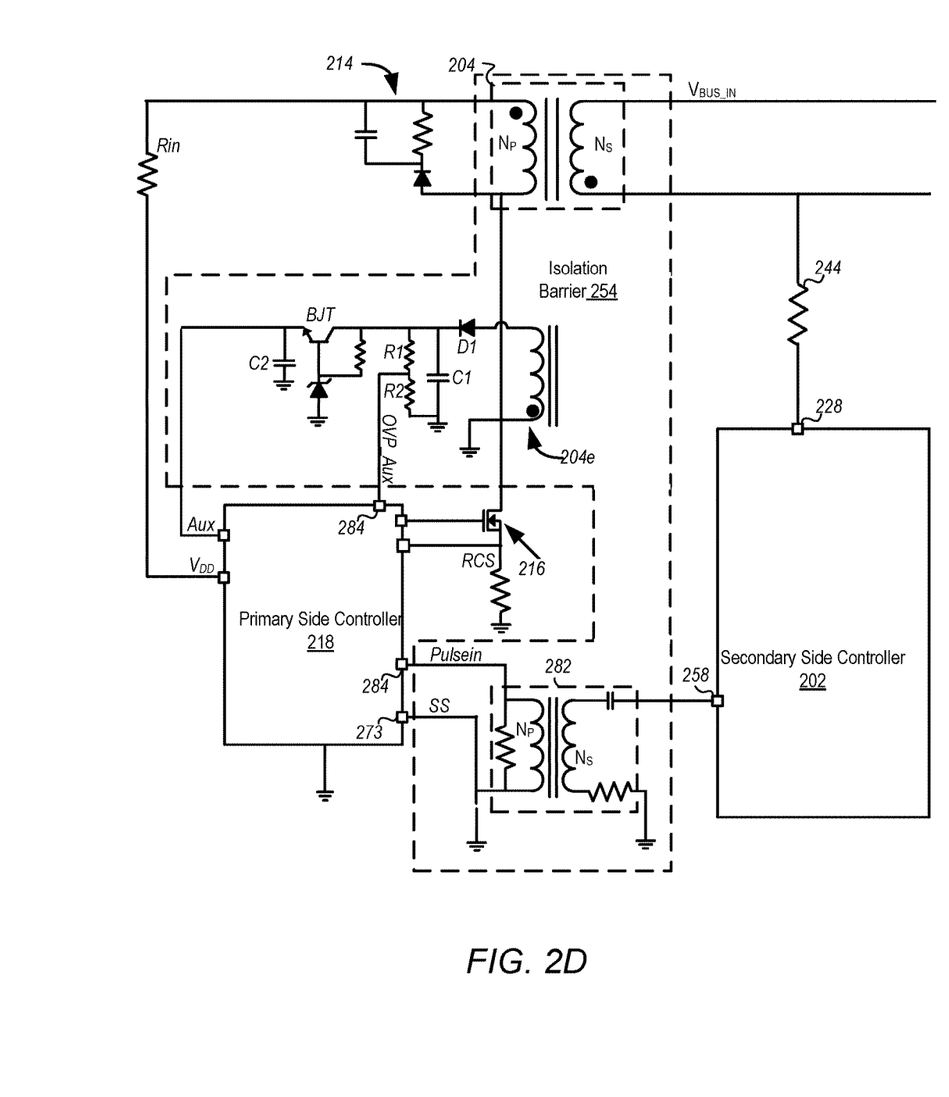
FIG. 2D is a schematic block diagram depicting another embodiment of the isolation barrier of FIG. 2A including a pulse transformer in accordance with the present disclosure.

FIG. 2D is a schematic block diagram depicting another embodiment of the isolation barrier of FIG. 2A including a pulse transformer 282 coupled between the PWM drive pin 258 of the secondary side controller 202 and a pulse_in pin 284 and a soft-start (SS) pin 273. The PWM drive pin 258 to the primary side controller 218 of the primary side controller 218 modulates the pulse width of the primary MOSFET in voltage mode control. In this architecture the primary side controller 218 engages the error amplifier 272 and the programmable ramp generator of the PWM circuit 264 to determine the pulse width of the PWM signal. This PWM signal is transferred from the secondary side controller 202 to the primary side controller 218 through the pulse transformer 282. This architecture, like that of FIG. 2C, also provides three key features: secondary side sensing and regulation, synchronous rectification, and charging port controller. The isolation barrier also includes an auxiliary coil of the transformer 204, which functions as a fly-back step-down transformer 204e to provide power to primary side controller 218 via an Aux pin. The step-down transformer 204e along with a diode D1 followed by capacitor C1 to ground stores the stepped-down-voltage which is then clipped by a bipolar junction transistor (BJT) structure and then coupled to the Aux pin. This additional circuit helps to reduce total power consumption of the AC-DC converter 200 as the primary side controller 218 is supplied through the Aux pin instead of by a separate power supply through another pin coupled to the first terminal 204a on the primary side 206 of the transformer 204 through Rin. A resistor divider R1, R2, connected to an over voltage protection (OVP)_AUX pin 284 of primary side controller 218 is used to sense a reflected voltage of $V_{BUS\_IN}$ on the secondary side 208 via the step-down transformer 204e. With this $V_{BUS\_IN}$ signal primary side controller 218 can disable PS 216, shown here as a PR_FET, using internal circuitry of the primary side controller.

Figure 2E:
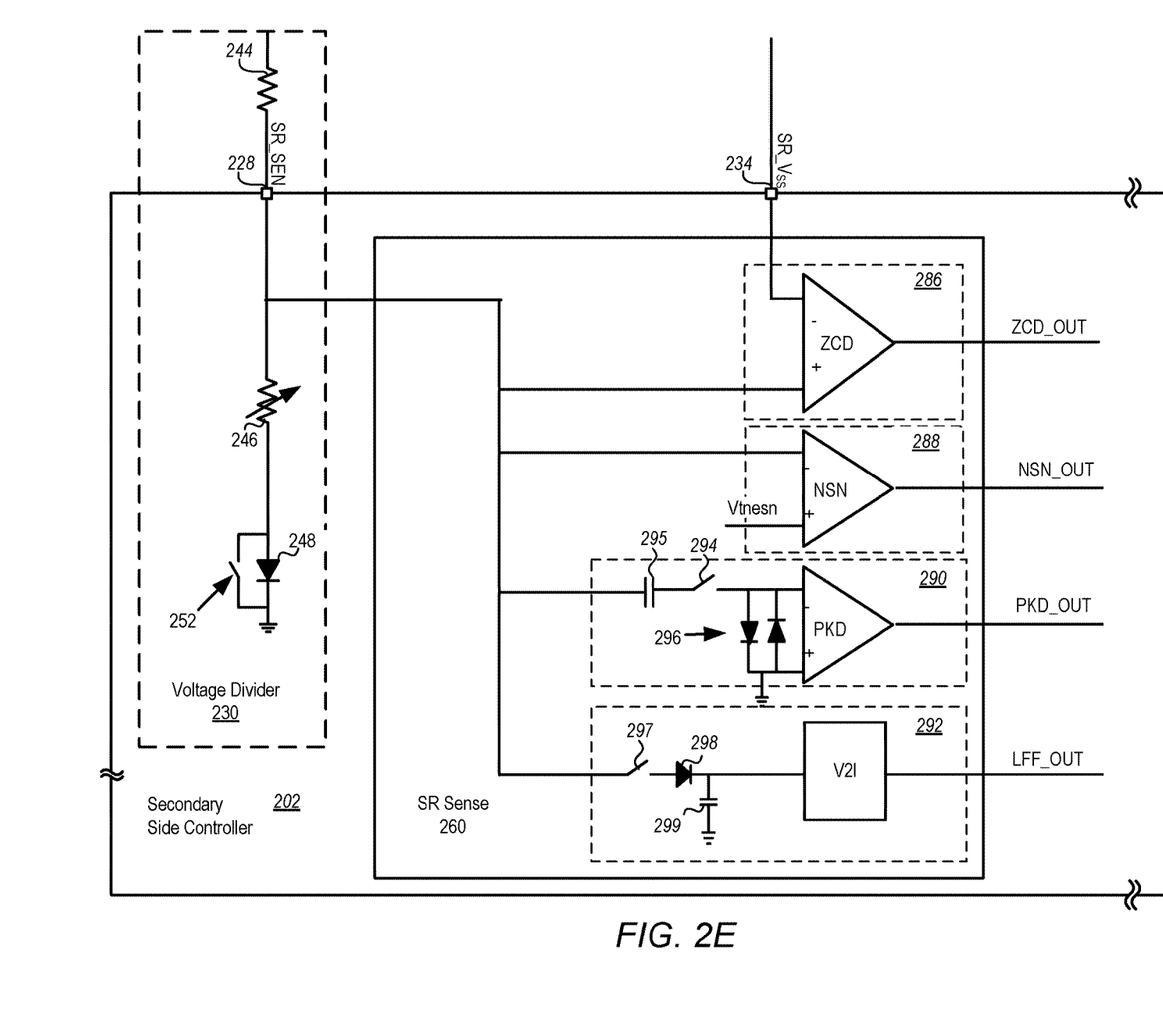
FIG. 2E is a schematic block diagram depicting of a portion of the secondary-side controller of FIG. 2B depicting an embodiment of the SR sense block in accordance with the present disclosure.

FIG. 2E is a schematic block diagram depicting of a portion of the secondary-side controller of FIG. 2B depicting an embodiment of the SR sense block 260 in accordance with the present disclosure. As shown in FIG. 2E, the SR sense block includes a zero-crossing detector (ZCD) block 286, a negative-sensing (NSN) block 288, a peak-detector (PKD) block 290, and Line-feed-forward (LFF) block 292, all integrally formed on a single IC with other components and elements of the secondary side controller 202.

The ZCD block 286 can include a comparator having a first, inverting input coupled through the SR-Vss pin 234 to the source node 226c of the SR 226, and a second, non-inverting input coupled to the SR-SNS pin 228 and through the voltage divider 230 to the drain node 226a of the SR. During the ZCD detection phase, where the SR_DRAIN 226a is at negative voltages and ramping towards 0V, the rectifier 248 is kept enabled without enabling switch 252 to allow no voltage division in voltage divider 230. This enables direct voltage of SR_DRAIN 226a at the non-inverting input of the ZCD comparator 286. The comparator of the ZCD block 286 can be configured to generate a zero current signal (ZCD_OUT) to turn off the SR 226 when zero voltage is sensed on the SR-SNS pin 228 and SR_DRAIN pin 226a crossing without any voltage division. No voltage division enables precise detection of Zero-current (or voltage crossing of SR_DRAIN 226a which improves efficiency of the AC-DC converter 200.

The NSN block 288 can also include a comparator having a first, inverting input coupled to the SR-SNS pin 228 and through the voltage divider 230 to the drain node 226a of the SR 226, and a second, non-inverting input coupled to a negative reference voltage (Vtnesn) which can be anywhere from −700 mV to +200 mV. This reference voltage Vtnesn can be defined to desired negative voltage trip point at which the controller needs to turn-on the SR GDRV 226b. An alternate method for negative reference voltage could be, for example, connecting non-inverting input coupled through the SR-Vss pin 234 to the source node 226c of the SR 226 and the comparator can have in-build offset to trip when SR-SNS pin 228 is at negative voltage. During the NSN detection phase, where the SR_DRAIN 226a is going from positive to negative voltages, the rectifier 248 is kept enabled without enabling switch 252 to allow no voltage division in voltage divider 230. This enables direct voltage of SR_DRAIN 226a at the inverting input 228 of the NSN comparator 288. The NSN comparator 288 generates a negative voltage signal (NSN_OUT) to turn-on the SR 226.

During power delivery on the secondary side, when the SR 226 turns-off, and as PS 216 has not yet turned-on, it results in LC sinusoidal oscillations on the SR_DRAIN 226a as well as inverted sinusoidal on the PR drain 204b terminal of the fly-back transformer 204. To improve AC-DC converter efficiency, Primary switch 216 must be turned on when there is a Valley in these sinusoidal oscillations, which corresponds to Peak on the secondary SR_DRAIN 226a node. The PKD block 290 is the peak sensing block on the secondary side. The PKD block 290 can also include a comparator having a first, inverting input coupled to the SR-SNS pin 228 through a switch 294 and an internal capacitor 295, and from the SR-SNS pin to the drain node 226a of the SR 226 through the voltage divider 230, and a second, non-inverting input coupled to ground. Generally, as in the embodiment shown the PKD block 290 further includes a back to back connected diode circuit 296 across the first and second inputs to the comparator to detect the peak of the sinusoidal waveform seen on SR_SEN 228. The comparator is configured to generate a peak voltage detection signal (PKD_OUT), which can be coupled to the primary side controller 218 to turn on the PS 216 to enable a valley switching mode of operation. The switch 294 is kept off during NSN and ZCD detection phase to avoid capacitive load offered by PKD block, on SR_SEN 228 node, which reduces the delay in sensing NSN and ZCD and improves performance and efficiency of the AC-DC converter 200. The switch 294 is turned-on during Peak-detection function, by using a derived signal of ZCD_OUT as ZCD_OUT decides turning-off of SR_FET 226, after which LC sinusoidal oscillation starts.

Finally, AC Line-Feed-Forward (LFF) block 292 can include a voltage-to-current (V2I) block, which is coupled through a switch 297, a sample and hold arrangement using diode element 298 along with charge-storage element (capacitor 299) to the SR-SNS pin 228 and through the voltage divider 230 to the drain node 226a of the SR 226. During the phase when primary switch 216 is turned on, the difference between node 204d and 204c of fly-back transformer develops a proportional reflected voltage of line-in rectified voltage on node 204a of transformer 204, in accordance to turn-ratio (N) of fly-back transformer 204. As node 204d is also coupled to SR_DRAIN 226a which is used as a sensing node insider secondary-side-controller 202 after a resistor divider 230, the node SR_SEN 228 also carries the line-in voltage information which is derived using LFF block 292. The line-in information can be used by secondary-side-controller 202 to alter the valley switching or PWM pulse-width to optimize the efficiency of the AC-DC converter 200 across variable AC line-in. The phase where primary switch 216 is turned-on and SR_DRAIN 226a gets reflected proportional voltage, is defined as feed-forward sensing phase and during this phase, switch 297 is turned-on to start sensing line-In voltage via SR_SEN 228 pin. At the same time, switch 252 is also turned on to bypass rectifier element 248 to allow exact resistive divided version of SR_DRAIN 226a to reach at the input of LFF block 292. The switch 297 is kept off during NSN and ZCD detection phases to avoid capacitive load offered by LFF block on SR_SEN 228 node, which helps to reduce the delay in sensing NSN and ZCD and improves performance and efficiency of the AC-DC converter 200. LFF block 292 is configured to generate a current signal (IFF_OUT) when the AC-DC converter 200 is operating in a feed-forward sensing mode. This IFF_OUT current then can be used to modulate PWM pulse-width as per line AC voltage, which improves performance and efficiency of the AC-DC converter over wide-range of AC input voltage range. The IFF_OUT current can also be converted to voltage which would be proportional to line AC input voltage and can be used for any function required on the secondary side controller, like for altering Valley at which primary FET 216 to be turned-on based on line AC voltage for same output power requirement, to improve performance of the AC-DC converter 200.

Figure 4:
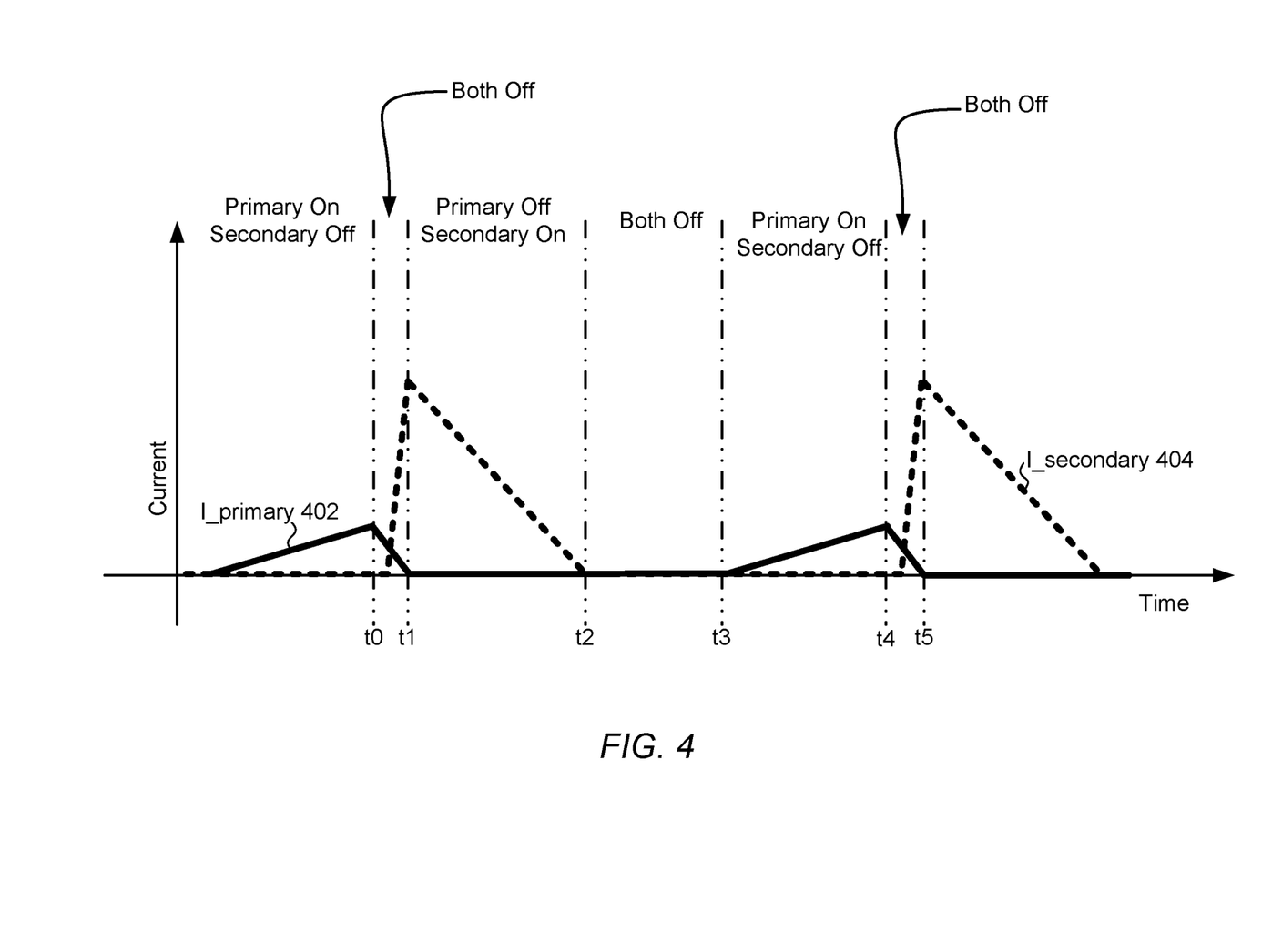
FIG. 4 is a graph showing primary current (I_primary) and secondary current (I_secondary) over time in the circuit of FIG. 2A as operated by the method of FIG. 3.
Figure 5:
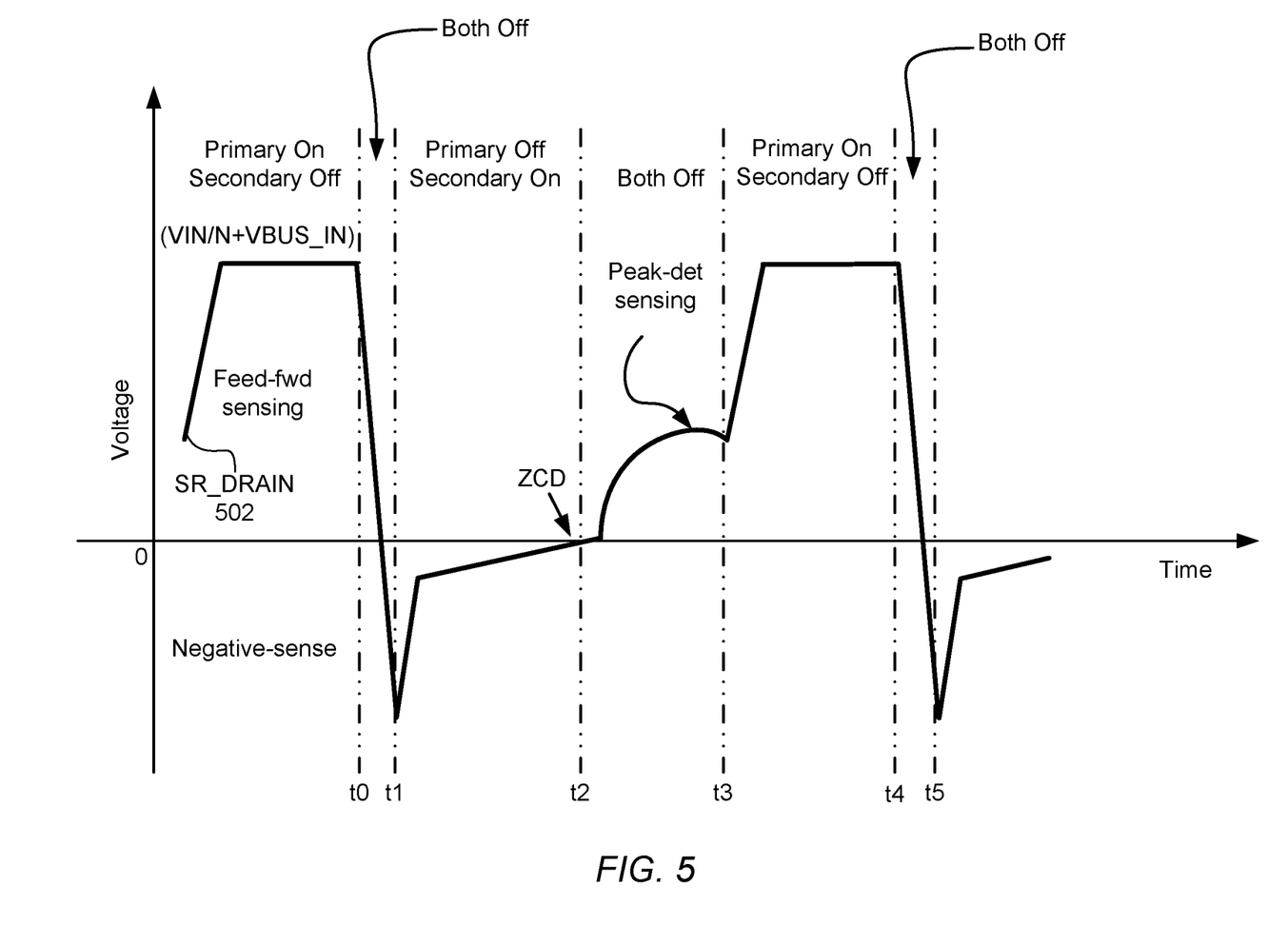
FIG. 5 is a graph showing voltage on a drain node of a SR over time in the in the circuit of FIG. 2A when operated by the method of FIG. 3.

A method of operating an AC-DC converter having a secondary side controller including an IC having a single SR-SNS pin through which the IC is coupled to the drain of a SR through a voltage divider will now be described with reference to the flowchart of FIG. 3, and the graphs of FIGS. 4 and 5. FIG. 4 is a graph showing primary current (I_primary 402) and secondary current (I_secondary 404) in the circuit of FIGS. 2A-E when operated by the method of FIG. 3. FIG. 5 is a graph showing the resulting voltage 502 on the drain node of the SR when operated by the method of FIG. 3.

Figure 3:
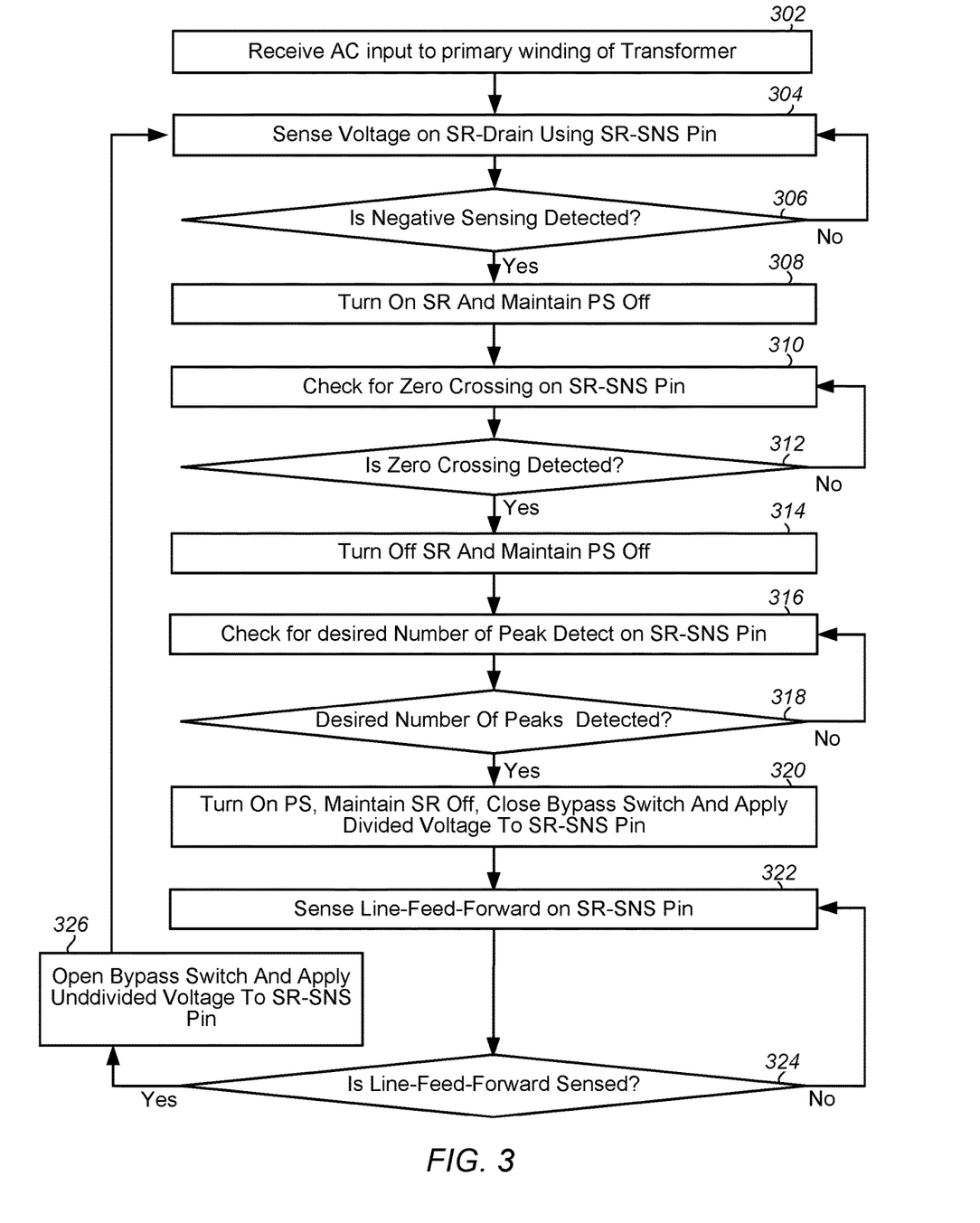
FIG. 3 is a flowchart illustrating an embodiment of a method for operating an AC-DC converter including a secondary-side controller and SR architecture in accordance with the present disclosure.

Referring to FIG. 3 and to FIGS. 2A and 2E the method begins with receiving a rectified AC input to the primary side 206 of the transformer 204 (302). A voltage on the drain 226a of the SR 226 is sensed through the single SR-SNS pin 228 (304). Next, it is determined if negative sensing is detected (306). Generally, determining if the AC-DC converter is operating in a negative sensing mode is accomplished by sensing an increasing negative voltage on the SR-SNS pin 228. If negative sensing is not detected step or block 304 is repeated and the voltage on the drain 226a of the SR 226 continues to be sensed through the single SR-SNS pin 228. If negative sensing is detected, the SR 226 is turned on while the power switch or PS 216 on the primary side is 206 of the transformer 204 is maintained off (308).

Next, a check is performed for a zero crossing on SR-SNS pin 228 using the ZCD block 286 in the secondary side controller 202 (310), and it is determined if a zero-crossing is detected (312). If a zero crossing is not detected step or block 310 is repeated to continue to check for a zero crossing on the SR-SNS pin 228. If a zero crossing is detected, the SR 226 is turned off and the PS 216 is maintained off (314).

A check is then performed for a predetermined or desired number of peaks of a predetermined or desired peak voltage detected on SR-SNS pin 228 using the PKD block 290 in the secondary side controller 202 (316), and it is determined if the desired number of peaks is detected (318). If the desired number of peaks is not detected step or block 316 is repeated to continue to check for the desired number of peaks. If the desired number of peaks is detected, the SR 226 is maintained off, the PS 216 is turned on (320), and the bypass switch 252 closed to apply a divided voltage to the SR-SNS pin 228.

Next, a check is performed to sense if the AC-DC converter 200 is operating in a Line-Feed-Forward (LFF) sensing mode (322), and a determination made whether or not LFF is sensed (324). Generally, determining if the AC-DC converter 200 is operating in a LFF sensing mode is accomplished by sensing a rising or steady positive voltage on drain 226*a* of the SR 226 applied through the single SR-SNS pin 228 using the LFF block 292. If the AC-DC converter 200 is not operating in a LFF sensing mode, step or block 322 is repeated to continue to check for LFF sensing. If it is determined the AD-DC converter is operating in a LFF sensing mode, bypass switch 252 is opened so that the voltage applied to the secondary side controller 202 through the single SR-SNS pin 228 is undivided by the voltage divider 230 (326), and step or block 304 is repeated to sense voltage on the drain 226*a* of the SR 226 through the single SR-SNS pin 228.

Thus, an AC-DC converter with secondary side control, and SR architecture, and methods for operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A secondary side controller for an AC-DC converter, the secondary side controller comprising an integrated circuit (IC) including a zero-crossing detector (ZCD) block, a negative-sensing (NSN) block, a peak-detector (PKD) block and a line-feed-forward (LFF) block integrally formed thereon, and a single SR-SNS pin through which the ZCD, PKD, NSN and LFF block are coupled to a drain of a synchronous rectifier (SR), wherein the single SR-SNS pin is coupled to the drain of the SR through a voltage divider circuit including circuit elements both internal and external to the IC, and wherein the circuit elements of the voltage divider includes an external resistive element having a resistance based on an AC input voltage to a primary side of a transformer of the AC-DC converter and a turn-ratio of the transformer.

2. The secondary side controller of claim 1, wherein the single SR-SNS pin has a maximum input voltage less than a rectified AC input voltage to a secondary side of the transformer of the AC-DC converter.

3. The secondary side controller of claim 1, wherein the external resistive element has a resistance selected to provide a maximum input voltage to the single SR-SNS pin of less than 21.5V.

4. The secondary side controller of claim 1, wherein the circuit elements of the voltage divider further include an internal resistive element coupled in series with an internal rectifier configured to prevent voltage division during negative-sensing and zero-crossing detection on the secondary side.

5. The secondary side controller of claim 4, wherein the circuit elements of the voltage divider further include a switch configured to short the internal rectifier during feed-forward-sensing, thereby enabling voltage coupled to be the single SR-SNS pin to be divided by the external resistive element and internal resistive element of the voltage divider.

6. The secondary side controller of claim 5, wherein the PKD block comprises a comparator coupled to the SR-SNS pin through an internal capacitor to detect a peak voltage on the SR-SNS pin without any clipping of the peak voltage, and is configured to generate a PKD_OUT signal which is processed and sent to a primary side controller to turn on a power switch (PS) coupled between an AC input and the primary side of the transformer to enable a valley switching mode of operation.

7. The secondary side controller of claim 4, wherein the ZCD block comprises a comparator coupled between the SR-SNS pin and a negative terminal of a DC output of the AC-DC converter, the comparator configured to generate a zero current signal to turn off the SR when zero voltage is sensed on the SR-SNS pin crossing without any voltage division.

8. The secondary side controller of claim 4, wherein the NSN block comprises a comparator coupled to the SR-sense to detect a negative voltage crossing without any voltage division, the comparator configured to generate a signal for turning on the SR.

9. The secondary side controller of claim 4, wherein the LFF block comprises a voltage-to-current (V2I) block coupled to the SR-sense to detect a proportional AC Line in voltage with a voltage division, and this line in voltage information is used to alter that parameters of the AC-DC converter.

10. A system comprising:
a transformer including a primary side coupled to receive a rectified AC input, and a secondary side coupled to a DC output and having a synchronous rectifier (SR) coupled between the DC output and the secondary side;
a secondary side controller including an integrated circuit (IC) comprising a zero-crossing detector (ZCD) block, a negative-sensing (NSN) block, a peak-detector (PKD) block, and a Line-Feed-forward (LFF) block integrally formed thereon, and a plurality of pins through which the IC is coupled to the secondary side of the transformer, the plurality of pins including a single SR-SNS pin through which the IC is coupled to a drain of the SR to sense voltage on a drain of the SR, and a SR-drive pin through which the IC is coupled to a gate of the SR, wherein the single SR-SNS pin is coupled to the drain of the SR through a voltage divider circuit including an external resistive element, an internal resistive element coupled in series with an internal rectifier, and a switch configured to bypass the internal rectifier, and wherein the secondary controller is configured to open the bypassing switch in parallel to the internal rectifier during negative sensing operations enabling a full undivided negative voltage to be sensed on the SR-SNS pin, and wherein the NSN block comprises a comparator coupled to the SR-SNS pin to detect a negative voltage crossing without any voltage division, the comparator configured to generate a signal for turning on the SR.

11. The system of claim 10, wherein the secondary controller is configured to open the bypassing switch in parallel to the rectifier during zero-crossing operations enabling an undivided voltage to be sensed on the SR-SNS pin, and wherein the ZCD block comprises a comparator coupled between the SR-SNS pin and a negative terminal of a DC output of the AC-DC converter, the comparator configured to generate a zero current signal to turn off the SR when zero voltage is sensed on the SR-SNS pin.

12. The system of claim 10, further comprising an isolation barrier including an opto-isolator between the secondary side controller and a power switch (PS) coupled between the rectified AC input and the primary side of the transformer.

13. The system of claim 10, further comprising an isolation barrier including a pulse transformer between the secondary side controller and a power switch (PS) coupled between the rectified AC input and the primary side of the transformer.

14. A system comprising:
a transformer including a primary side coupled to receive a rectified AC input, and a secondary side coupled to a DC output and having a synchronous rectifier (SR) coupled between the DC output and the secondary side;
a secondary side controller including an integrated circuit (IC) comprising a zero-crossing detector (ZCD) block, a negative-sensing (NSN) block, a peak-detector (PKD) block, and a Line-Feed-forward (LFF) block integrally formed thereon, and a plurality of pins through which the IC is coupled to the secondary side of the transformer, the plurality of pins including a single SR-SNS pin through which the IC is coupled to a drain of the SR to sense voltage on a drain of the SR, and a SR-drive pin through which the IC is coupled to a gate of the SR,
wherein the single SR-SNS pin is coupled to the drain of the SR through a voltage divider circuit including an external resistive element, an internal resistive element coupled in series with an internal rectifier, and a switch configured to bypass the internal rectifier, and
wherein the secondary controller is configured to close the switch bypassing the internal rectifier during a feed-forward operation to sense AC line-in voltage to alter internal parameters of the AC-DC converter, enabling the voltage on the drain of the SR and coupled to be the single SR-SNS pin to be divided by the external resistive element and internal resistive element of the voltage divider, and wherein the PKD block comprises a comparator coupled to the SR-SNS pin through an internal capacitor to detect a peak voltage on the SR-SNS pin substantially without any clipping of the peak voltage, the comparator configured to generate a PKD_OUT signal which is processed and sent to a primary side controller to turn on a power switch (PS) coupled between the rectified AC input and the primary side of the transformer to enable a valley switching mode of operation.

15. The system of claim 14, wherein the secondary controller is configured to open the bypassing switch in parallel to the rectifier during zero-crossing operations enabling an undivided voltage to be sensed on the SR-SNS pin, and wherein the ZCD block comprises a comparator coupled between the SR-SNS pin and a negative terminal of a DC output of the AC-DC converter, the comparator configured to generate a zero current signal to turn off the SR when zero voltage is sensed on the SR-SNS pin.

16. The system of claim 14, further comprising an isolation barrier including an opto-isolator between the secondary side controller and a power switch (PS) coupled between the rectified AC input and the primary side of the transformer.

17. The system of claim 14, further comprising an isolation barrier including a pulse transformer between the secondary side controller and a power switch (PS) coupled between the rectified AC input and the primary side of the transformer.

18. A method of operating an AC-DC converter with synchronous rectifier (SR) architecture comprising:
receiving a rectified AC input to a primary side of a transformer;
sensing a voltage on a drain of a synchronous rectifier (SR) coupled to a secondary side of the transformer with a secondary side controller comprising an integrated circuit (IC) including a single SR-SNS pin through which the IC is coupled to the drain of the SR; and
controlling the SR with the secondary side controller to regulate a DC output from the secondary side of the transformer based on the voltage sensed on the drain of the SR,
wherein sensing the voltage on the drain of SR comprises sensing through the single SR-SNS pin a feed-forward operation, a negative voltage on the drain, a zero crossing, or a peak voltage detection, and
wherein the single SR-SNS pin is coupled to the drain of the SR through a voltage divider circuit including an external resistive element, an internal resistive element coupled in series with an internal rectifier, and a switch configured to bypass the internal rectifier, and wherein sensing the feed-forward operation comprises closing the switch enabling the voltage coupled to the single SR-SNS pin to be divided by the voltage divider, and wherein controlling the SR comprises to generating a SR drive signal to turn on or off the SR.

19. The method of claim 18 wherein the AC-DC converter further comprises a power switch (PS) coupled between the rectified AC input and the primary side, and further comprising on sensing the feed-forward operation during turn-on of PS defined by the secondary side controller a PS drive signal to turn on the PS.

20. The method of claim 19 wherein when feed-forward operation is not sensed and a negative voltage is received on the drain of the SR, sensing the voltage on the drain of SR comprises opening the switch to enable sensing an undivided voltage on the SR-SNS pin, and wherein when a negative voltage is sensed controlling the comprises generating a SR drive signal to turn-on the SR.

21. The method of claim 19 wherein when feed-forward operation is not sensed and a negative voltage is approaching towards zero volt to the drain of the SR, sensing the voltage on the drain of SR comprises checking for a zero crossing, and wherein if a zero-crossing is detected controlling the SR comprises generating a SR drive signal to turn-off the SR.

22. The method of claim 21 wherein if a zero-crossing is detected sensing the voltage on the drain of SR comprises checking for a peak voltage on the single SR-SNS pin, and if a peak voltage is detected further comprising generating with the secondary side controller a PS drive signal to turn on the PS enabling a valley switching mode of operation.

\* \* \* \* \*